US007389269B1

(12) United States Patent
Robinson et al.

(10) Patent No.: US 7,389,269 B1
(45) Date of Patent: Jun. 17, 2008

(54) SYSTEM AND METHOD FOR ACTIVATING FINANCIAL CARDS VIA BIOMETRIC RECOGNITION

(75) Inventors: Timothy L. Robinson, Reston, VA (US); Bradford R. Schildt, Boulder, CO (US); Tennille V. Goff, Springfield, VA (US); Daniel J. Corwin, Ashburn, VA (US)

(73) Assignee: BioPay, LLC, Herndon, VA (US)

( * ) Notice: Subject to any disclaimer, the term of this patent is extended or adjusted under 35 U.S.C. 154(b) by 111 days.

(21) Appl. No.: 10/848,354

(22) Filed: May 19, 2004

(51) Int. Cl.
*G06Q 99/00* (2006.01)
(52) U.S. Cl. .................. 705/50; 705/51; 713/176
(58) Field of Classification Search .................. 705/50, 705/51; 713/176
See application file for complete search history.

(56) References Cited

U.S. PATENT DOCUMENTS

| 5,787,186 | A |   | 7/1998 | Schroeder |
| 5,984,181 | A | * | 11/1999 | Kreft ............................ 235/380 |
| 6,112,985 | A | * | 9/2000 | Weinlaender ................ 235/380 |
| 6,173,400 | B1 | * | 1/2001 | Perlman et al. .............. 713/172 |
| 6,268,788 | B1 |   | 7/2001 | Gray |
| 6,389,542 | B1 | * | 5/2002 | Flyntz ......................... 713/201 |
| 6,662,166 | B2 |   | 12/2003 | Pare et al. |
| H2120 | H | * | 7/2005 | Cudlitz ........................ 235/382 |
| 2001/0051924 | A1 |   | 12/2001 | Uberti |
| 2002/0196963 | A1 |   | 12/2002 | Bardwell |
| 2003/0172027 | A1 |   | 9/2003 | Scott |
| 2004/0054913 | A1 |   | 3/2004 | West |
| 2007/0063816 | A1 | * | 3/2007 | Murakami et al. ......... 340/5.82 |

FOREIGN PATENT DOCUMENTS

JP 02003178033 A * 6/2003

OTHER PUBLICATIONS

Vocent Solutions, Inc. Voice Authentication Solutions (http://www.vocent.com/products/).

* cited by examiner

*Primary Examiner*—Pierre Eddy Elisca
(74) *Attorney, Agent, or Firm*—Pepper Hamilton LLP

(57) ABSTRACT

The present invention is a system and method for activating financial cards via biometric authentication of an individual presenting the card for activation. Information from the financial card presented for activation is entered into the system and is stored in association with the card presenter's biometric information. Financial card activation is enabled via the biometric system sending the entered financial card information and an authorization of the identity of the card presenter to the card provider for card activation.

17 Claims, 3 Drawing Sheets

SYSTEM AND METHOD FOR ACTIVATING FINANCIAL CARDS VIA BIOMETRIC RECOGNITION

FIELD OF THE INVENTION

This application relates generally to biometric identity verification. More particularly, the present invention provides a system and method for activating financial cards via biometric recognition.

BACKGROUND OF THE INVENTION

Newly issued financial cards typically require card owners to activate the cards before using them to conduct financial transactions. Common methods of activating such cards include the recipient verifying receipt of the card by calling the card provider via a phone number associated with the home address the recipient provided when applying for the card. During application review, card providers verify that the phone number an applicant provides in his application is linked to the address he provided. Then during activation, the card provider verifies that the card recipient is, in fact, the card owner by verifying that the recipient is calling from a telephone number associated with the address provided with the card application. This verification typically occurs via Automatic Number Identification technology, and if the calling number is verified, the card is activated.

Unfortunately, although this method of financial card activation provides some security it is not foolproof. Typically, the card provider uses caller identification (ID) to verify that the credit card is being activated from the proper telephone number, but card providers do not always verify the activation number via caller ID for any number of reasons, some of the most common relating to the calling number information being blocked. Additionally, phone number verification poses security problems in situations where various persons are sharing the same home address. For example, a person sharing a home address with an individual who applied for a card might easily activate and proceed to use a card recipient's new card simply by activating the card from the card recipient's phone. Therefore, the security of card activation is compromised. Additional methods of security implemented during card activation include the card recipient verifying personal information. However, if the calling telephone number is not verified, verifying personal information provides little security, as such information may be fraudulently obtained and verified.

In addition to security problems of card verification some card applicants may not have a well established phone number linked to their home address for various reasons, such as their replacing a landline with a cell phone, their inability to obtain a phone line, and/or their not wishing to have a phone. Such issues are typically common among lower income individuals who have not been able to establish a "trusted" telephone number with which to associate and build their credit. Because such individuals have little or no credit and because they have no fixed home address with which to associate a "trusted" telephone number, they are, in turn, unable to establish credit. What is needed are more secure and convenient methods of activating financial cards.

SUMMARY OF THE INVENTION

The present invention is a system and method for activating financial cards via biometric authorization of a card presenter. Individuals wishing to activate their financial cards enroll in a biometric authorization system by at least registering biometric information. The individual may activate his financial cards by presenting card information and his biometric information to the system.

BRIEF SUMMARY OF THE DRAWINGS

Objects and advantages of the present invention will be apparent in the following detailed description read in conjunction with the accompanying drawing figures. Although the following figures suggest an order of information flow, the order in which information is entered and transmitted need not be definite.

DETAILED DESCRIPTION OF THE INVENTION

In accordance with the present invention, a system and method is provided for activating a financial card (e.g., credit card, charge card, debit card, smart card, or the like) via biometric verification. Verifying that an individual is the card owner and not a fraudulent card presenter is an important security measure in activating a financial card. In general, a financial card or other financial token may embody any item that indicates a financial relationship between a financial service provider and a financial service subscriber. While the following description is provided using a card as an example, it should be recognized that the principles of the present invention would apply to any physical or virtual financial token. For example, emerging technologies such as cell phones capable of conducting financial transactions and other wireless device-enabled-financial transactions should also be considered in the scope of the invention.

Figure 1:
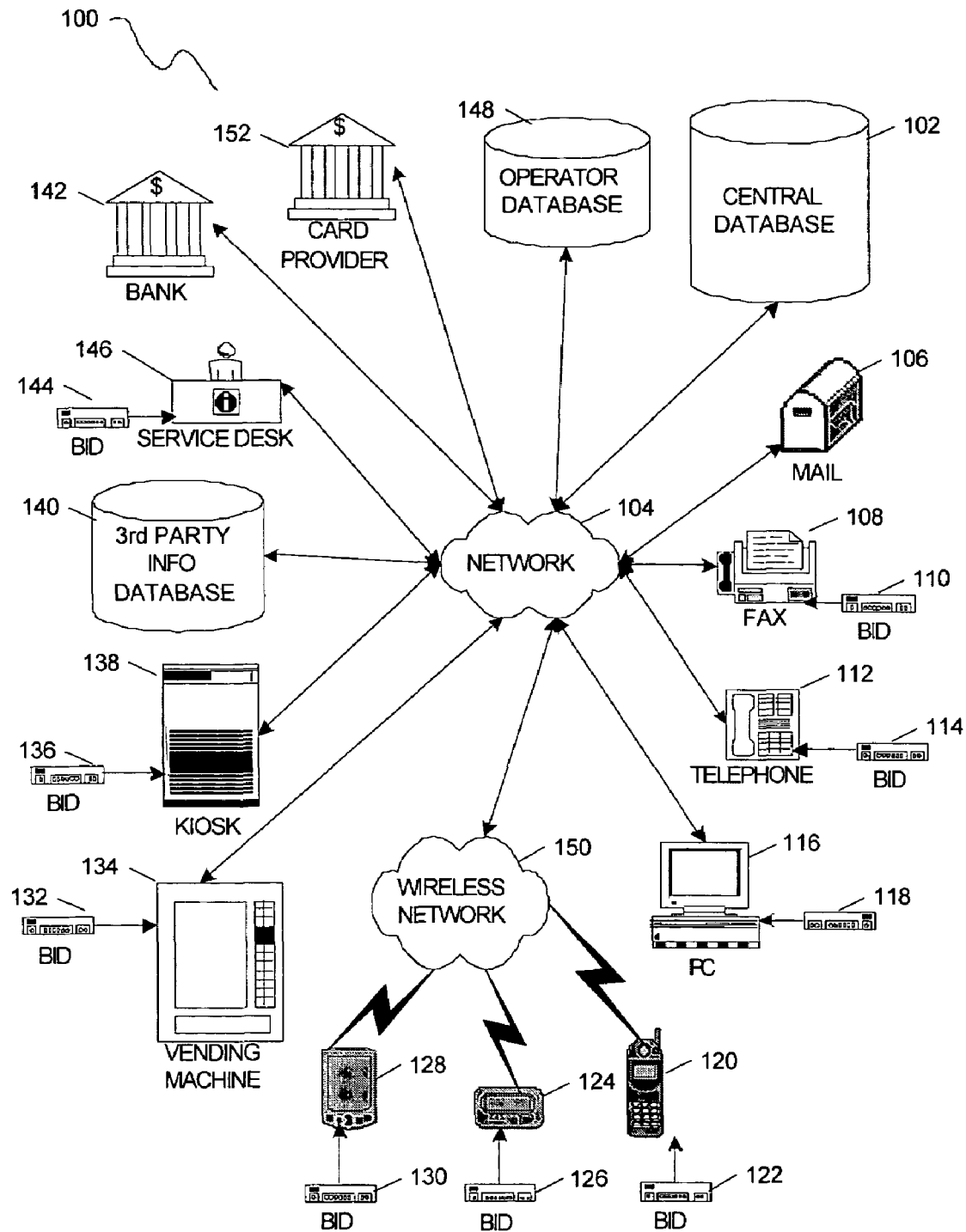
FIG. 1 illustrates an overview of the general architecture of a system for activating financial cards via biometric identity verification of a card presenter.

FIG. 1 illustrates a general architecture overview of a system for activating financial cards via biometric identity verification of card presenters (hereon "users"). As will be described in greater detail below, activation system 100 enables card owners to activate financial cards by presenting card information and biometric information for identity verification. Individuals enable biometric identity verification by enrolling personal information and biometric information in the system. Individuals may enroll in the system and/or activate financial cards with the system at any system device 108, 112, 116, 120, 124, 128, 134, 138, and 146 with connected and/or integrated biometric device (BID) 110, 114, 118, 122, 126, 130, 132, 136, and 144. System components that help enable users to enroll in the system and/or activate financial cards via biometric identity verification include one or more system databases, a central database 102 and/or an operator database 148; a bank 142; a card provider 152; and/or a third party information database 140. A central database 102 and/or an operator database 148 are used to store user system records, wherein user enrollment information is stored and which are accessed for biometric information used in biometric identity verification for card activation. A third party information database 140 may be used for collecting user identity and/or personal information and may also be a system database. A bank 142 and/or a card provider 152 allows money transfer throughout the system. A card provider is by way of illustration but not limitation an entity that manages transactions and/or extends credit to card owners via cards. Additionally, a system database, 102 and/or 148, communicates with the card provider 152 and/or serves as an information bridge from a third party information database 140 and the card provider 152 to relay identity verification of a user and enable card activation.

A user may enroll in the identity verification system prior to seeking activation of a financial card. Information the user enters for enrollment includes at least a user biometric received at a BID, but may also include additional information such as user name, address, telephone number, driver's license information, social security information, email address, and other similar personal identifying information. This information may be entered into the system via various methods, such as electronically pulling the information from a user personal token (e.g., driver's license, credit card, check card, check), pulling the information from a third party database, and or verbally receiving the information from the user and hand keying the information into the system. The method of entering user personal information might also include a user presenting a card with biometric information represented and/or encoded on the card. For example, the user may already own a "smart" credit card that contains biometric information encoded in a smart chip on the card. In this case, the user might present this card for added verification of his identity and added verification that the biometric data he is presenting for enrollment into the system matches biometric data previously registered with another source, in this case the provider of the presented "smart" credit card. Once the user information is entered it is stored in a system database to form a new user system record. Once the individual is enrolled in the system, the user may more easily activate financial cards with the system.

Figure 2:
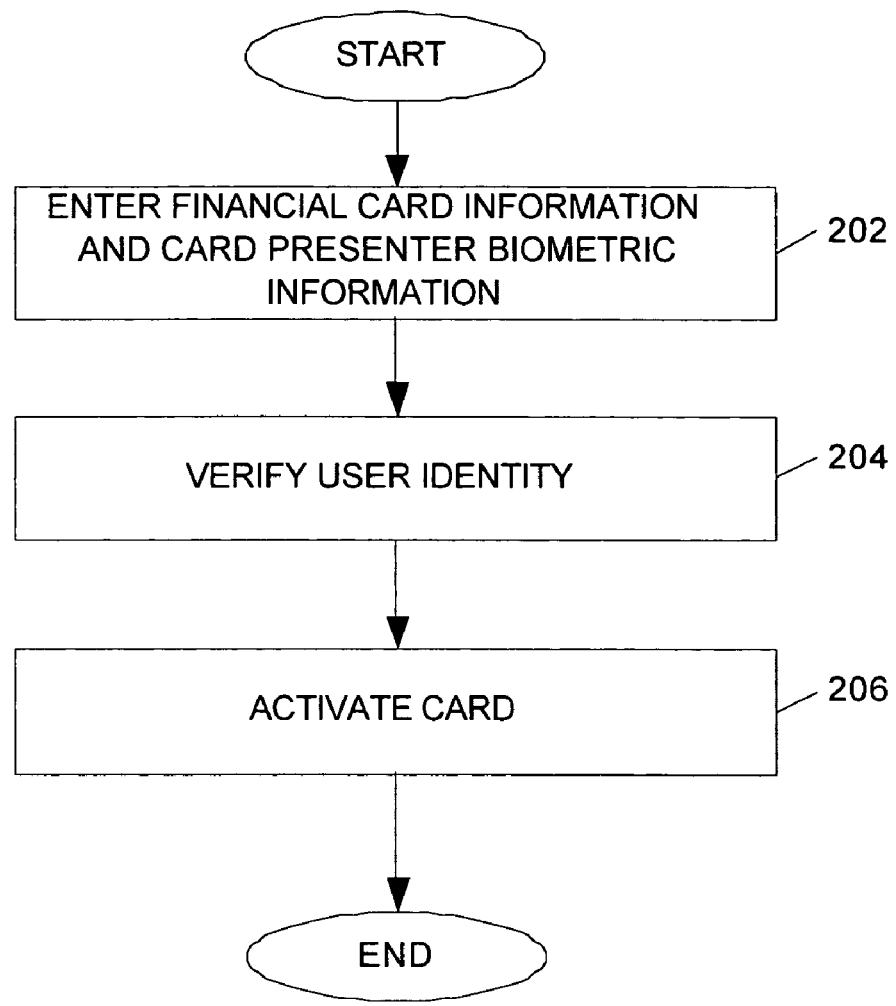
FIG. 2 illustrates a flowchart of a process for enrolling a card presenter in a system for biometric identity verification.

FIG. 2 illustrates a method by which a user activates a financial card through biometric identity verification. At step 202, information pertaining to the card presented for activation is entered into the system. Examples of such information pertaining to the card include various unique card identifiers, such as the card number, the card expiration date, the name of the card holder, and/or the card identification number, also referred to as the card security code. Card information is preferably entered into the system via an automated electronic method, wherein information is electronically pulled directly from the card. Examples of such methods include but are not limited to magnetic (MAG) stripe reads, bar code reads, radio frequency identification (RFID) reads, smart chip reads, and various wireless communications, such as Bluetooth. Automated electronic entry of card information is preferred for security reasons. Such methods of entering card information into the system assure the card provider that the card is actually present at activation. Alternate methods of entering card information, such as hand-keying card information into the system, can be done without the card present, and therefore, do not assure the card provider that the card was present during activation. Cards not being present at activation jeopardize activation security because a card thief might easily steal card information and present it for activation.

Also at step 202, the user enters her biometric. In an additional embodiment, the user might also enter a system identification number (SID) that is used in conjunction with the user's biometric data to verify her identity. Additionally, if the user is not enrolled in the system, she enters identity verification information. At step 204, the user's identity is verified. Should the user be previously registered in the system, her identity is verified by matching her biometric sample with a biometric sample that has been previously registered and associated with the user.

The system may use any number of biometric identity verifying methods to verify the user's identity. In one embodiment, the user's card information and biometric information is sent to a database, wherein the biometric the user presents for card activation is compared to her biometric data held in that database in an effort to verify the user's identity. If the biometrics match, then the user's identity is verified. In another embodiment, a user enters her card information, biometric, and an SID. The SID information is then sent to a database, where the user SID is used to locate the user's record. The registered biometric associated with the user's record is then sent back to the device being used for card activation. If the user's registered biometric matches her biometric presented for card activation, the card activation is approved, and the card and approval are forwarded to the database. Should the user not be enrolled in the system, verification might include the system requesting verification of the user's biometric from a biometric database maintained by a third party or from a token storing and/or representing biometric data.

The system database to which the user information is sent may be maintained by any number of parties, such as the card provider or an affiliated and/or unaffiliated third party. Additionally, user biometric data may be entered into the database in varying methods. For example, the user may enroll in the database, and that database may provide the biometric data for verification of the user. Additionally, user biometric data may be entered into the database from another biometric database. For example, if the card provider maintains the system database, the card provider might request biometric data on a pre-approved user or a user who has applied for a card from a third party database such as the department of motor vehicles in which the user is registered, provided that department of motor vehicles records and shares biometric data.

At step 206, once the user's identity is biometrically verified, the card provider may activate the card. If the user's identity is verified by a third party, indication of the verification is forwarded to the card provider. Once the card is activated, the system may additionally notify the user of activation success. Additionally, if the card the user presents for activation is one that requires a biometric be encoded thereon during activations, this procedure might accompany and/or follow the activation.

Such an embodiment of card activation may occur at any system device and/or activation station connected to a biometric identification device (BID) 108, 112, 116, 120, 124, 128, 134, 138, and 146. Such activation may occur with or without the supervision of a system operator. For example, a user might activate his financial card via a telephone 112, perhaps a payphone, with an integrated BID 114 by hand-keying his unique card identifiers and presenting his biometric information. A system with increased security might require a system operator to monitor the card activation to verify that the presenter is entering information into the system properly and/or provide face-to-face identity verification of the user. Such monitoring may include a system operator being physically present at the point of activation. Additionally, monitoring may consist of the system operator remotely monitoring the activation via real-time observation or observation of a recording of the transaction.

In an additional embodiment, card activation may occur concurrently with a user's enrolling in the system. In such a method, card information is entered; user enrolling information is entered, including a user biometric; the user information and card information are sent to a database; the user information and card information are stored in the database to form a user record; one or more pieces of user information and the card information are sent to the card provider; and the card provider activates the card. In an additional embodiment, the database is checked to assure that the presenter is not already registered in the system.

Figure 3:
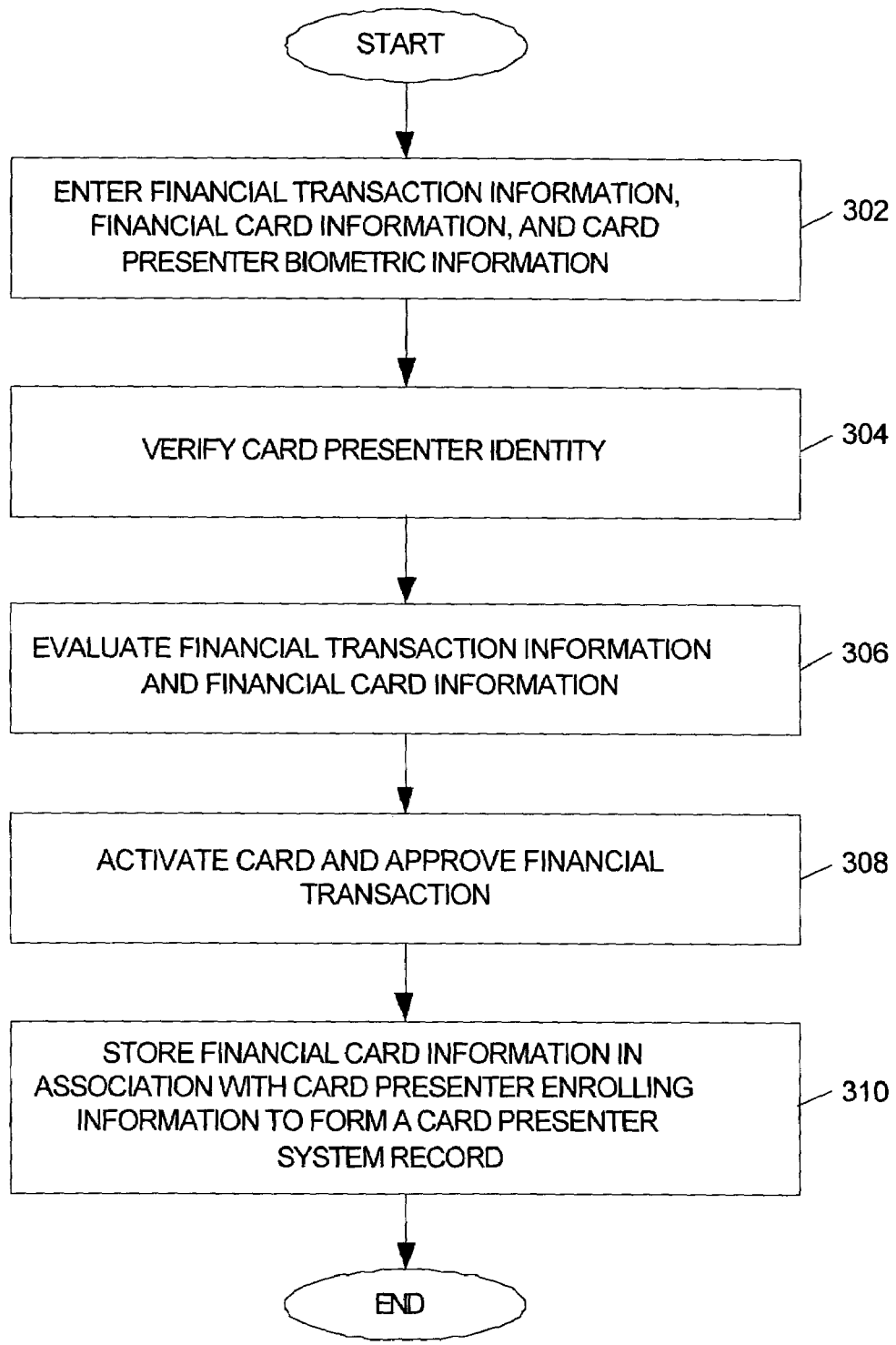
FIG. 3 illustrates a flowchart of a process for activating a financial card in a system via biometric identity verification of the card owner.

FIG. 3 illustrates yet an additional method, in which a user activates a financial card through biometric identity verification with the system while conducting a financial transaction with the card. While the biometric card activation system provides more security than current card activation methods, it also allows a user the convenience of activating his financial card(s) during a financial transaction, a method which allows system users to conduct three actions concurrently in a single transaction: enrollment in the biometric system, activation of the financial card via biometric authentication, and payment for a financial transaction with the financial card he is presenting for activation. Referring now to FIG. 3, at step 302, financial transaction information, user enrolling information including a user biometric, and financial card information are entered into the system. At step 304, the user's identity is verified. A user's identity might be verified simply by a transaction attendant reviewing a user identification document. Additionally, the user's identity may be verified by comparing a user biometric to a user biometric obtained from a third party database or from a token. At step 306, once the user's identity is verified, the financial card information and financial transaction information are evaluated for approval. This evaluation may be performed by the card provider or the biometric system. The biometric system might additionally be enabled to activate the user's card. In such an embodiment, the information entered at step 302 would be evaluated against one or more agreed upon activation parameters. Record of one or more such activations and financial transactions might be sent to the card provider immediately or might be batched for later processing. In step 308, if approved the user is notified of the approval. At step 310, financial card information is stored in association with user enrollment information, both of which are stored at a system database. The financial transaction information might also be stored in association with the user information.

The invention also poses an added advantage to card applicants who might be declined approval for financial cards due to problems with their home address and/or phone number provided in their card application. Many card applicants who are declined approval for financial cards do not have a fixed home address and/or an established phone number. Additionally, card applicants who have not yet established credit in the financial world need a method of effectively doing so. The present invention provides card applicants with the opportunity to begin establishing credit by offering them financial cards based upon their biometric information, at a minimum.

Via a related additional embodiment, the card activation system and method enables system operators who supervise activations in the system to dispense financial cards, should a card provider allow such a transaction. For example, a user may electronically apply for a financial card at a system operator station. Should the user already be enrolled in the system, he requests to apply for the card and biometrically verifies his identity with the system. If the user is not enrolled in the system, he would need to enroll in the system along with his application for the financial card. The system operator then enters card information from a single card in a set of cards that the card provider has authorized the system operator to disburse. The application, card information, and user identity verification is sent to the card provider, and if the provider approves the application, the card is activated, and the system operator disburses the agreed upon card to the user. Since the disbursed card is activated, the user may immediately use the dispensed card if he wishes. For example, he may immediately conduct a purchase transaction and/or other financial transactions with the card, such as depositing cash onto the card. Additional examples of a user immediately using his newly activated card might include combining the embodiment being with a biometrically authorized check cashing transaction. In this embodiment, the user might wish to have the system operator supervising the check cashing transaction to credit the amount of case he will receive from the check cashing transaction directly onto his newly activated financial card. In such an embodiment, the biometric check cashing transaction might be integrated with the card application and/or activation. In an alternate embodiment, the card provider might authorize the system operator to approve activation of the dispensed card should the applicant meet certain agreed upon parameters. In such an embodiment, notice of card activation that the system operator forwards to the card provider may occur immediately or may be batched with other approvals for later transmission.

A system and method for activating financial cards via biometric identity verification has been illustrated. It will be appreciated by those skilled in the art that the system and method of the present invention can be used to perform financial card activation transactions without the user having to present and/or verify personal information other than his biometric information each time he wishes to activate a financial card. Additionally, the system and method provides a way for various financial card owners to securely activate their financial cards. It will thus be appreciated by those skilled in the art that other variations of the present invention will be possible without departing from the scope of the invention as disclosed.

What is claimed is:

1. A method for activating a financial token, the method comprising:

issuing an inactivated financial token to a token holder, said unactivated financial token being loaded with account information for said token holder, wherein said unactivated financial token in possession of said token holder is usable after an identity verification of said token holder is performed prior to activation of said unactivated financial token;

receiving financial token information from a token activation station at which said unactivated financial token is presented by said token holder;

receiving an indication of whether token holder biometric data taken at said token activation station matches registered token holder biometric data that is stored in a database; and when said token hole's biometric data does not match registered token holder biometric data, prompting said token holder to enroll in a biometric identity verifying system.

2. The method of claim 1, wherein said financial token information is taken from the financial token via an electronic read of the token.

3. The method of claim 1, wherein said biometric data is electronically pulled from a token.

4. The method of claim 1, further comprising storing said financial token information and said token holder biometric data as a user record in a database in a system for biometric identity verification.

5. The method of claim 1, wherein a system operator verifies one or more of said financial token information and token holder biometric data.

6. The method of claim 5, wherein said verification includes said system operator presenting one or more of system operator biometric data, a system operator identification code and a passcode.

7. The method of claim 1, further comprising:
  sending an identification code from said token activation station to a database;
  receiving from the database registered token holder biometric data associated with a token holder identification code; and
  determining whether the token holder biometric data matches the registered token holder biometric data.

8. The method of claim 1, further comprising:
  sending said token holder biometric data and said financial token information to a database affiliated with a token provider; and
  receiving notification from said database that token activation is approved.

9. The method of claim 8, wherein said token holder is notified that token activation is approved.

10. A method for activating a financial token at a point of sale, the method comprising:
  receiving, at a point of sale, a financial transaction request from a token holder seeking to pay for said financial transaction using a financial token issued to said token holder, wherein said financial token is unactivated, wherein said financial transaction request includes financial transaction information, information from said financial token, and token holder biometric data;
  determining whether said token holder biometric data matches registered biometric data stored in association with a user record of an individual identified by said information from said financial token;
  if said determination indicates a match:
    sending a verification of an identity of said token holder and said financial token information to a token provider;
    receiving, from said token provider, confirmation of an activation of said financial token;
    approving said financial transaction request upon receipt of said confirmation; and
    processing fulfillment of said financial transaction request using said financial token; and
  when said determination does not indicate a match, prompting the token holder to enroll in a biometric identity verifying system.

11. The method of claim 10, further comprising, if said determination does not indicate a match, storing said token holder biometric data and said financial token information in a system user record in a system database.

12. The method of claim 10, further comprising issuing said financial token to said token holder via mail.

13. The method of claim 10, wherein said financial token is a credit card.

14. The method of claim 10, wherein said determination occurs at said point of sale.

15. The method of claim 10, wherein said determination occurs at a system database.

16. A method for activating a financial token, comprising:
  issuing an unactivated credit card to a user, said unactivated credit card having recorded thereon identifying information of said user and financial account information;
  at an authorization station, retrieving user identifying information and financial account information from said unactivated credit card;
  receiving biometric data from said user who presents said unactivated credit card to said authorization station; and
  when said user's biometric data does not match registered user biometric data, prompting the user to enroll in a biometric identity verifying system.

17. The method of claim 16, wherein said authorization station is at a point of sale.

* * * * *